UNITED STATES PATENT OFFICE 2,360,992

OIL BASE DRILLING FLUID

Walter John Weiss, Long Beach, Calif., assignor, by mesne assignments, to The Texas Company, New York, N. Y., a corporation of Delaware No Drawing. Application August 14, 1941,
Serial No. 406,843

11 Claims. (Cl. 252—8.5)

This invention relates to the art of drilling wells, and particularly to an oil base drilling fluid which is characterized by excellent cake thickness and fluid loss properties.

Various types of oil base drilling fluids have been proposed. As the name implies, the base used in these drilling fluids is an oil, preferably a crude oil or a petroleum distillate or residue, or a coal tar distillate or residue. Also, equivalent non-aqueous liquids may be used, but for economic reasons the base is usually a crude oil of petroleum origin or a fraction thereof. Examples of suitable bases are topped crudes, gas oil, lubricating oil and kerosene.

The drilling fluids also contain a weighting material which is preferably oil wettable (i. e., the material is wet by oil in preference to water) in the drilling fluid, although the wetting characteristics of the weighting material may in some cases be affected by another ingredient of the drilling fluid so as to make it preferentially oil wettable. As weighting materials that have been proposed, there may be mentioned spent contact clay that has been used for decolorizing or filtering mineral oils, such as spent fuller's earth; weighting materials coated with a carbonaceous substance to impart or increase the oil wettability of the material, such as materials of the type of barytes, finely divided calcium carbonate, oyster shell, silica, iron oxide, clays or the like; metallic sulfides, such as lead sulfide and copper sulfide; oxides of lead, such as red lead; and other mineral materials that are preferentially oil wettable. As indicated above, in some cases a material which alone is not preferentially oil wettable may be used in combination with a substance that desirably alters the wettability characteristics of the material. Such a material in the fluid in question is preferentially oil wettable.

One type of oil base drilling fluid that has been proposed contains a sedimentation inhibitor or suspending agent which acts to prevent or retard the settling of the weighting material. As sedimentation inhibitors, it has been proposed to use sulfuric acid and petroleum sulfonic acids and sulfonates that are oil soluble. Suitable sulfonic acids are produced, for example, by treating petroleum oils with fuming or concentrated sulfuric acid. Thus, the oil soluble sulfonic acids produced by treatment of heavy oils to produce lubricants or highly refined medicinal oils have been proposed as sedimentation inhibitors. There have also been proposed for this purpose various sulfated and sulfonated organic compounds of high molecular weight which are soluble in oil. By selecting the proper sedimentation inhibitor, it is possible to obtain a drilling fluid which upon contamination with water produces a water-in-oil emulsion.

The oil base drilling fluids are employed primarily for the purpose of avoiding penetration of the producing zone by water, which takes place in certain cases when water base drilling fluids are used. While the oil base fluids have achieved this purpose, they are generally characterized by the disadvantage that on use they result in the formation of a tough, leathery cake which is thicker than the mud cakes laid down by good water base drilling fluids. Accompanying this effect is the fact that these drilling fluids lose a good deal of fluid during use. Apparently, the cake laid down is not impervious to the fluid until a substantial thickness is reached.

The present invention is concerned with oil base drilling fluids which contain an oil, a weighting material which is preferentially oil wettable, and a sedimentation inhibitor, which fluids are adapted to form water-in-oil emulsions.

The invention has for its primary object to provide oil base drilling fluids of this type which are characterized by improved cake thickness and fluid loss properties.

Other objects of the invention will in part be obvious and will in part appear hereinafter.

In accordance with the present invention, a fluid is prepared containing an oil, a weighting material which is preferentially oil wettable, and a sedimentation inhibitor that cooperates with the other materials to yield a fluid adapted to form a water-in-oil emulsion upon admixture with water. This fluid is then mixed with a liquid that is substantially insoluble in oils, preferably water, so as to form an emulsion in which the liquid is the disperse phase. As described below, the liquid is selected, or an agent is used with the liquid, so as to produce an emulsion which on use produces a relatively thin cake and loses less fluid than the oil base drilling fluids which have been described previously.

It has been found that valuable drilling fluids may be prepared by mixing a base fluid of the type described containing an oil, a weighting material and a sedimentation inhibitor, with water in the presence of an agent that improves the manner in which the water is emulsified with the oil. It has been found that alkali metal silicates, alkali metal resinates, and casein function to improve the characteristics of the emulsions. A preferred agent for use is sodium meta-silicate. The water is advantageously incorporated in the fluid as a solution containing the agent. Thus, it has been found that improved drilling fluids may be obtained by adding an aqueous solution of sodium metasilicate (containing about 10 per cent sodium meta-silicate), an aqueous solution of sodium resinate or a basic colloidal suspension of casein (e. g. an aqueous solution of sodium caseinate) to the base fluid.

Improved drilling fluids may also be prepared without using water but instead using another liquid which is insoluble or at most only slightly soluble in the base fluid. As examples of such substantially insoluble liquids that have been found to be valuable for use in the emulsions, there may be mentioned pine oil, castor oil and polyhydroxy aliphatic compounds such as diethylene glycol and glycerine. Drilling fluids containing liquids of this class may contain water and also may contain an agent for improving the characteristics of the resulting emulsion.

Emulsion drilling fluids of the invention are characterized by the fact that they form relatively thin cakes as compared with the usual oil base drilling fluids and their fluid loss characteristics are much improved. While it is not intended to limit the invention to any theoretical explanation, researches leading to the development of the invention have indicated that the drilling fluids of the invention produce relatively thin cakes and do not result in large fluid loss because, after a thin cake of solids is laid down upon the formation being drilled, the minute globules of the emulsified liquid pack off against the thin cake, thus forming a fluid block against the cake and preventing further fluid loss with its subsequent increase of solids added to the filter cake. It appears that the globule size, or, stated in another way, the degree of emulsification of the liquid in the fluid is the controlling factor in the efficiency of such a pack-off. The globule size or degree of emulsification in turn appears to be determined by the interfacial tension between the base fluid and the admixed, substantially oil-insoluble liquid. Thus, it is believed that the agents such as sodium meta-silicate have the property of changing the interfacial tension between the base fluid and water so as to increase the degree of emulsification of the water.

In the case of the organic liquids which may be employed as the disperse phase, it is believed that the interfacial tension between such liquids and the base fluid is less than the interfacial tension between water and the base fluids; therefore, such liquids may be more completely emulsified with the base fluid than water when used alone. Accordingly, the non-aqueous, substantially oil-insoluble liquids that may be used in producing the emulsions are those which when mixed with the base fluid produce an emulsion in which the degree of emulsification is greater than the degree of emulsification that would be obtained by mixing water with the base fluid. The drilling fluids of the invention, therefore, may be defined as emulsions of substantially oil-insoluble liquids, preferably water, in a base fluid of the type described characterized by the fact that the degree of emulsification of the liquid in the base fluid is greater than the degree of emulsification that would be obtained by mixing water with the fluid.

In order that the invention may be understood more fully reference should be had to the following examples in which are disclosed valuable drilling fluids of the invention. It will be understood that these examples are given for illustrative purposes merely and are not intended as limitations of the invention. Where parts are mentioned, they are by weight.

Example I 400 parts of spent refinery clay were suspended in about 307 parts of a 30° A. P. I California (Signal Hill) crude oil and the resulting suspension was treated with 3 per cent by volume of concentrated (98 per cent) sulfuric acid. The fluid prepared in this manner is considered as the base fluid and itself is capable of use as a drilling fluid.

The base fluid was then intimately mixed with 5 per cent by volume of a 10 per cent aqueous solution of sodium meta-silicate. As a result, a stable water-in-oil emulsion was formed.

The base fluid and the water-in-oil emulsion were tested by the usual method employed for testing drilling fluids and the following results were obtained.

|  | Base fluid | Emulsion |
|---|---|---|
| Gravity, lbs. per cu. ft | 70.5 | 70.5 |
| Viscosity, centipoises | 167 (at 80° F.) | 200 (at 76° F.) |
| Filter press test at 1,000 lbs. per square inch: |  |  |
| a. Fluid loss, c. c. per square inch per hour | 8.690 | 0.095 |
| b. Cake thickness, inches | 49/64 | ±3/64 |

The filter press test referred to in the table is a conventional test used for drilling fluids. The fluid is placed in the cell of a press over a felt-padded bottom permitting the slow passage of fluid. The pressure on the fluid is then raised to 1000 pounds per square inch and maintained at that point for one hour. The fluid expressed is collected and measured and the thickness of the cake formed is measured. Through extended use this test has been shown to provide an accurate determination of the comparative value of drilling fluids.

It will be seen that in its fluid loss and cake thickness properties the emulsion is much superior to the base fluid.

As brought out above, the weighting material used in the drilling fluids of the invention are preferably preferentially oil wettable, although in some cases a weighting material may be affected by the other ingredients of the fluid so as to be preferentially oil wettable in the fluid while normally not exhibiting such property. As a feature of the invention it has been found that drilling fluids may be prepared to contain both oil wettable weighting materials and materials which are normally not oil wettable. If the latter type of materials are finely ground and relatively heavy it is possible to obtain a heavier ( i. e. greater specific gravity) fluid. With fluids of the type in which the oil used is crude oil, and the specific gravity has been increased by the addition of a finely ground weighting material, it has been found that the viscosity of the fluid may be improved by the addition of a light oil, such as kerosense. Fluids of this general type are characterized by relatively high weight and low viscosity. While the added weighting material has a slight adverse effect upon the settling characteristics of the fluid, the fluid is no worse in this respect than many available fluids and settling may be avoided when storing the fluid by effecting slow circulation.

The following example discloses a particularly valuable fluid which is characterized by high specific gravity and relatively low viscosity.

Example II

A batch of drilling fluid was prepared by mixing about 75 parts of spent filter clay, about 125 parts of finely ground silica, about 278 parts of 21° A. P. I. crude oil, and about 7.5 parts of concentrated sulfuric acid. Then about 25 parts of a 10 per cent aqueous solution of sodium meta-silicate were mixed in to form an emulsion with the oil. To the emulsion was added about 40 parts of kerosene. The fluid had the following properties:

| | |
|---|---|
| Gravity, lbs. per cu. ft. | 71.5 |
| Viscosity, centipoises: | |
| At 86° F | 63 |
| At 100° F | 49 |
| At 122° F | 43 |
| Filter press test at 1,000 lbs. per square inch: | |
| Fluid loss, cc. per square inch per hour | 0.41 |
| Cake thickness, inches | ±2/64 |

Valuable drilling fluids can be prepared using a base fluid such as is described in the examples and mixing therewith 5 per cent by volume of castor oil, pine oil, diethylene glycol or glycerine.

It will be understood that the foregoing examples are merely illustrative of the drilling fluids of the invention and that fluids of similar properties may be prepared using other materials of the classes referred to above. For example various base oils and other weighting materials may be used in place of those disclosed in the examples. Also, other agents acting to improve the emulsions may be used. It will also be understood that the drilling fluids of the invention may contain, in addition to the materials described above, other materials which may be added to improve or vary the properties of the fluids.

As noted above, the sedimentation inhibitor may be any material which yields a fluid adapted to form a water-in-oil emulsion. Although sulfuric acid is preferred, valuable fluids have been prepared using oil soluble sulfonic acids and sulfonates, and kerosene acid sludge, resulting from the treatment of kerosene with strong sulfuric acid, has been found to be suitable. As shown by the examples, when using sulfuric acid, the acid is reacted with the mineral oil, preferably with a mixture of the mineral oil and spent refinery clay, before adding the water or other oil-insoluble liquid and the agent to improve the cake thickness and fluid loss properties.

In making up the fluids, the proportions of materials used may be varied. These proportions are affected by the properties of the materials. For example, it is preferable in most cases to use as large an amount of weighting material as can be used and still obtain a pumpable mixture. This maximum amount is dependent upon the gravity of the base oil used, and the impurities present in the clay. As described in the examples, where it is desired to reduce the viscosity of the fluid additional oil may be added.

The amount of substantially insoluble liquid used may vary within wide limits, provided only that the amount is not greater than the amount that can be emulsified with the oil. Thus, the liquid may constitute as high as 25 to 35 per cent by weight of the drilling fluid. It is preferred, however, to use from 3 to 10 per cent by weight of this liquid. It is also advisable to keep the amount of this liquid relatively low since water may enter the fluids on use.

As to the agents added with water to improve the character of the resulting emulsions, it will be understood that the optimum amount of such an agent to be used will depend upon the efficacy of the agent, the properties of the base drilling fluid, and whether or not additional water will be introduced in drilling. In the normal case, this amount may be determined by tests of the type described above. When using sodium meta-silicate it is satisfactory to employ an amount corresponding to about 10 per cent by weight of the water, but more or less than this amount can be used to produce an improved emulsion drilling fluid.

Since changes may be made in the products and processes described without departing from the scope of the invention, it is intended that the description shall be taken as illustrative and not in a limiting sense.

I claim:

1. An emulsion drilling fluid in which a substantially oil-insoluble liquid is the disperse phase and a mineral oil is the continuous phase, said fluid comprising a mineral oil, said substantially oil-insoluble liquid, a weighting material, and a sedimentation inhibitor, said sedimentation inhibitor cooperating with said mineral oil, said substantially oil-insoluble liquid, and said weighting material to produce an emulsion in which said substantially oil-insoluble liquid is the disperse phase, said substantially oil-insoluble liquid being selected from the group consisting of aqueous solutions containing agents acting to lower the interfacial tension between water and said mineral oil and substantially oil-insoluble organic liquids which have substantially lower interfacial tensions than water with said mineral oil, said emulsion drilling fluid being characterized by its excellent cake thickness and fluid loss properties.

2. An emulsion drilling fluid in which water is the disperse phase and a mineral oil is the continuous phase, said fluid comprising a mineral oil, water, a weighting material, a sedimentation inhibitor, said sedimentation inhibitor cooperating with said mineral oil, said water, and said weighting material to produce an emulsion in which said water is the disperse phase, and an agent acting to lower the interfacial tension between said water and said mineral oil, said emulsion drilling fluid being characterized by its excellent cake thickness and fluid loss properties.

3. An emulsion drilling fluid in which a substantially oil-insoluble organic liquid is the disperse phase and a mineral oil is the continuous phase, said fluid comprising a mineral oil, said substantially oil-insoluble organic liquid, a weighting material, and a sedimentation inhibitor, said sedimentation inhibitor cooperating with said mineral oil, said substantially oil-insoluble organic liquid, and said weighting material to produce an emulsion in which said substantially oil-insoluble organic liquid is the disperse phase, said substantially oil-insoluble organic liquid having a substantially lower interfacial tension than water with said mineral oil, said emulsion drilling fluid being characterized by its excellent cake thickness and fluid loss properties.

4. An emulsion drilling fluid in which water is the disperse phase and a mineral oil is the continuous phase, said fluid comprising a mineral oil, water, a preferentially oil wettable weighting material, a sedimentation inhibitor which cooperates with said oil, said water, and said weighting material to produce an emulsion in which said water is the disperse phase, and an alkali metal silicate, said emulsion drilling fluid being characterized by its excellent cake thickness and fluid loss properties.

5. An emulsion drilling fluid in which water is the disperse phase and a mineral oil is the continuous phase, said fluid comprising a mineral oil, water, a preferentially oil wettable weighting material, a sedimentation inhibitor which cooperates with said oil, said water, and said weighting material to produce an emulsion in which said water is the disperse phase, and sodium meta-silicate, said emulsion drilling fluid being characterized by its excellent cake thickness and fluid loss properties.

6. An emulsion drilling fluid in which water is the disperse phase and a crude petroleum oil is the continuous phase, said fluid comprising a crude petroleum oil, water, a spent refinery clay, the reaction product of concentrated sulphuric acid with a mixture of said crude petroleum oil and said spent refinery clay, and sodium meta-silicate, the reaction product acting as a sedimentation inhibitor and the sodium meta-silicate acting to improve the cake thickness and fluid loss properties of said emulsion drilling fluid, said emulsion drilling fluid being characterized by its excellent cake thickness and fluid loss properties.

7. An emulsion drilling fluid in which water is the disperse phase and a crude petroleum oil is the continuous phase, said fluid comprising a crude petroleum oil, water, spent refinery clay, finely divided silica, the reaction product of concentrated sulphuric acid with a mixture of said crude petroleum oil and said spent refinery clay, sodium meta-silicate, and kerosene, the reaction product acting as a sedimentation inhibitor and the sodium meta-silicate acting to improve the cake thickness and fluid loss properties of said emulsion drilling fluid, said emulsion fluid being characterized by its excellent cake thickness and fluid loss properties.

8. An emulsion drilling fluid in which water is the disperse phase and a mineral oil is the continuous phase, said drilling fluid being prepared by reacting a mixture of said mineral oil and spent refinery clay with concentrated sulfuric acid, and mixing the resulting product with water and with a compound selected from the group consisting of an alkali metal silicate, an alkali metal resinate, and an alkali metal caseinate, said emulsion drilling fluid being characterized by its excellent cake thickness and fluid loss properties.

9. An emulsion drilling fluid in which water is the disperse phase and a mineral oil is the continuous phase, said drilling fluid being prepared by reacting a mixture of said mineral oil and spent refinery clay with concentrated sulfuric acid, and mixing the resulting product with water and with sodium meta-silicate, said emulsion drilling fluid being characterized by its excellent cake thickness and fluid loss properties.

10. An emulsion drilling fluid in which water is the disperse phase and a mineral oil is the continuous phase, said fluid comprising a mineral oil, water, a weighting material, a sedimentation inhibitor, and a compound selected from the group consisting of an alkali metal silicate, an alkali metal resinate, and an alkali metal caseinate, said emulsion drilling fluid being characterized by its excellent cake thickness and fluid loss properties.

11. An emulsion drilling fluid in which a substantially oil-insoluble organic liquid is the disperse phase and a mineral oil is the continuous phase, said fluid comprising a mineral oil, said substantially oil-insoluble organic liquid, a weighting material, and a sedimenation inhibitor, the interfacial tension between said subtantially oil-insoluble organic liquid and said mineral oil being substantially less than the interfacial tension between water and said mineral oil, whereby the globules of said substantially oil-insoluble organic liquid are substantially smaller than the globules formed by mixing water alone with a fluid comprising said oil, said weighting material, and said sedimentation inhibitor, said emulsion drilling fluid being characterized by its excellent cake thickness and fluid loss properties.

WALTER JOHN WEISS.